United States Patent
Lee et al.

(10) Patent No.: US 11,044,758 B2
(45) Date of Patent: Jun. 22, 2021

(54) OPERATION METHOD FOR COMMUNICATION NODE TRANSMITTING SYSTEM INFORMATION IN COMMUNICATION NETWORK

(71) Applicant: ELECTRONICS AND TELECOMMUNICATIONS RESEARCH INSTITUTE, Daejeon (KR)

(72) Inventors: Jung Hoon Lee, Daejeon (KR); Min Hyun Kim, Busan (KR); Ji Hyung Kim, Daejeon (KR); Cheul Soon Kim, Daejeon (KR); Sung Hyun Moon, Daejeon (KR); Ju Ho Park, Daejeon (KR); Jun Hwan Lee, Seoul (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 86 days.

(21) Appl. No.: 16/318,393

(22) PCT Filed: Dec. 21, 2017

(86) PCT No.: PCT/KR2017/015214
§ 371 (c)(1),
(2) Date: Jan. 17, 2019

(87) PCT Pub. No.: WO2018/117677
PCT Pub. Date: Jun. 28, 2018

(65) Prior Publication Data
US 2019/0306889 A1  Oct. 3, 2019

(30) Foreign Application Priority Data

Dec. 22, 2016  (KR) .................. 10-2016-0176782
Jun. 21, 2017  (KR) .................. 10-2017-0078782
Dec. 18, 2017  (KR) .................. 10-2017-0173909

(51) Int. Cl.
*H04W 74/08* (2009.01)
*H04W 72/04* (2009.01)
(Continued)

(52) U.S. Cl.
CPC ......... *H04W 74/0833* (2013.01); *H04J 11/00* (2013.01); *H04L 1/16* (2013.01);
(Continued)

(58) Field of Classification Search
CPC .......... H04J 11/00; H04L 1/16; H04L 1/1685; H04L 1/1819; H04L 5/00; H04L 5/0007;
(Continued)

(56) References Cited

U.S. PATENT DOCUMENTS 8,379,567 B2  2/2013  Cho et al.
8,520,600 B2  8/2013  Kim et al.
(Continued)

FOREIGN PATENT DOCUMENTS

JP  2010-506434 A2  2/2010
WO  2016-130353 A2  8/2016
WO  2016/198909 A1  12/2016

OTHER PUBLICATIONS

Search Report, dated Apr. 26, 2018, for International Application No. PCT/KR2017/015214.
(Continued)

*Primary Examiner* — Ahmed Elallam
(74) *Attorney, Agent, or Firm* — LRK Patent Law Firm

(57) ABSTRACT

An operation method for a communication node transmitting system information in a communication network is an operation method for a base station which transmits system information in a communication network, and includes: configuring information on a request time when system
(Continued)

information is requested and a transmission time when the system information is transmitted in a communication network; transmitting a message including the configured information on the request time and the transmission time by using a broadcast-based method; receiving, from at least one user equipment included in the communication network, a message requesting the system information on the basis of the request time; and transmitting a message including the system information to the at least one user equipment on the basis of the transmission time.

10 Claims, 13 Drawing Sheets

(51) Int. Cl.
*H04W 48/14* (2009.01)
*H04L 5/00* (2006.01)
*H04W 72/08* (2009.01)
*H04L 1/16* (2006.01)
*H04J 11/00* (2006.01)

(52) U.S. Cl.
CPC ............... *H04L 5/00* (2013.01); *H04L 5/005* (2013.01); *H04W 48/14* (2013.01); *H04W 72/087* (2013.01)

(58) Field of Classification Search
CPC ..... H04L 5/0048; H04L 5/005; H04L 5/0053; H04W 48/14; H04W 72/087; H04W 74/0833
See application file for complete search history.

(56) References Cited

U.S. PATENT DOCUMENTS

| | | | |
|---|---|---|---|
| 8,724,444 | B2 | 5/2014 | Ko et al. |
| 9,119,134 | B2 | 8/2015 | Jeong et al. |
| 9,398,511 | B2 | 7/2016 | Zhang et al. |
| 10,187,848 | B2 | 1/2019 | Mustapha |
| 10,200,920 | B2* | 2/2019 | Kubota ................. H04W 48/12 |
| 10,356,702 | B2* | 7/2019 | Ingale .................. H04W 48/12 |
| 10,390,331 | B2* | 8/2019 | Adjakple ............. H04W 76/10 |
| 10,455,621 | B2* | 10/2019 | Agiwal .................. H04W 4/06 |
| 10,911,943 | B2* | 2/2021 | Chou ................ H04W 72/0446 |
| 2012/0063370 | A1 | 3/2012 | Worrall |
| 2013/0210439 | A1 | 8/2013 | Bae et al. |
| 2014/0334372 | A1 | 11/2014 | Vos |
| 2015/0382284 | A1 | 12/2015 | Brismar et al. |
| 2016/0270013 | A1 | 9/2016 | Soriaga et al. |
| 2017/0251500 | A1* | 8/2017 | Agiwal ............. H04W 72/0413 |
| 2018/0131487 | A1* | 5/2018 | Ly ....................... H04W 72/042 |
| 2019/0174554 | A1* | 6/2019 | Deenoo ................ H04W 80/02 |
| 2019/0191453 | A1* | 6/2019 | Xiong .............. H04W 72/0406 |
| 2019/0191487 | A1* | 6/2019 | Kwon ....................... H04L 1/00 |
| 2019/0215828 | A1* | 7/2019 | Kim ..................... H04W 72/04 |
| 2019/0274093 | A1* | 9/2019 | Xiao ................. H04W 72/1221 |
| 2019/0394753 | A1* | 12/2019 | Adjakple ............. H04W 16/02 |

OTHER PUBLICATIONS

Written Opinion, dated Apr. 26, 2018, for International Application No. PCT/KR2017/015214.

* cited by examiner

OPERATION METHOD FOR COMMUNICATION NODE TRANSMITTING SYSTEM INFORMATION IN COMMUNICATION NETWORK

CROSS-REFERENCE TO RELATED APPLICATIONS

The present application is a U.S. National Phase entry from International Application No. PCT/KR2017/015214, filed Dec. 21, 2017, which claims priority to Korean Patent Application Nos. 10-2016-0176782, filed Dec. 22, 2016, 10-2017-0078782, filed Jun. 21, 2017, and 10-2017-0173909, filed Dec. 18, 2017, the disclosures of which are incorporated by reference herein in their entirety.

BACKGROUND

1. Technical Field

The present invention relates to an operation method of a communication node transmitting system information in a communication network, and more particularly, to an operation method of a communication node transmitting system information according to a request for system information in a communication network.

2. Description of Related Art

In a communication network, a terminal (e.g., user equipment) may generally transmit and receive data through a base station. For example, when there is data to be transmitted to a second terminal, a first terminal may generate a message containing data to be transmitted to the second terminal, and may transmit the generated message to a first base station to which it belongs. The first base station may receive the message from the first terminal, and identify that a destination of the received message is the second terminal. The first base station may transmit the message to a second base station to which the second terminal, which is the identified destination, belongs. The second base station may receive the message from the first base station and identify that the destination of the received message is the second terminal. The second base station may transmit the message to the second terminal which is the identified destination. The second terminal may receive the message from the second base station and obtain the data contained in the received message.

Meanwhile, in the communication network, the terminal may obtain downlink related information (e.g., frequency, time synchronization, a cell ID, and the like) based on a synchronization signal periodically transmitted from the base station. Then, the terminal may establish a radio link to the base station and acquire system information transmitted from the base station through the established radio link. Then, the terminal may access the base station by performing an access procedure to the base station based on the acquired system information.

As described above, the system information transmitted from the base station may be periodically transmitted regardless of a request of the terminal. That is, in the communication network, the base station periodically transmits the system information without a request for the system information. Accordingly, the base station in the communication network may transmit the system information unnecessarily, thereby failing to efficiently use radio resources.

SUMMARY

The present invention is directed to providing an operation method of a communication node of a communication node transmitting system information according to a request for system information in a communication network.

An operation method of a base station for transmitting system information in a communication network, according to an embodiment of the present invention to achieve the above-described purpose, may comprise configuring information on a request time of the system information and a transmission time of the system information in the communication network; transmitting a message including the information on the request time of the system information and the transmission time of the system information in a broadcast manner; receiving, from at least one terminal included in the communication network, a message requesting the system information based on the request time; and transmitting, to the at least one terminal included in the communication network, a message including the system information based on the transmission time.

Here, the information on the request time may include information on a time point at which the system information can be requested.

Here, the time point at which the system information can be requested may be one of a first time point preconfigured for requesting the system information at the at least one terminal and a second time point at which the at least one terminal can perform uplink transmission.

Here, the message requesting the system information may be received from the at least one terminal at the time point at which the system information can be requested.

Here, the information on the transmission time may include one of information on a time point at which the system information is transmitted from the base station and information on at least one time period during which the system information is transmitted.

Here, the time point at which the system information is transmitted may be one of a first time point after a predetermined time from a time point of receiving the message requesting the system information and a second time point preconfigured for periodically transmitting the system information.

Here, the message including the system information, when transmitted in the at least one time period, may be transmitted based on a plurality of redundancy versions in the at least one time period.

An operation method of a base station for transmitting system information in a communication network, according to another embodiment of the present invention to achieve the above-described purpose, may comprise receiving a message requesting the system information from a plurality of groups each of which includes at least one terminal in the communication network; configuring parameters for transmission of the system information for each of the plurality of groups; and transmitting messages including the system information for the plurality of groups based on the configured parameters.

Here, the message requesting the system information may be transmitted based on a RACH preamble that is a resource preconfigured by the base station for requesting the system information.

Here, the configured parameters may include a transmission time of the system information and an identifier used for transmitting the system information.

Here, in the configuring parameters, transmission times and identifiers for a first system information for a first group included in the plurality of groups and a second system information for a second group included in the plurality of groups may be configured so that the first system information and the second information are distinguished from each other.

Here, in the configuring parameters, when the transmission times for the first system information and the second system information are configured to be identical to each other, the identifiers for the first system information and the second information may be configured to be different from each other.

Here, in the configuring parameters, when the transmission times for the first system information and the second system information are configured to be different from each other, the identifiers for the first system information and the second information may be configured to be identical to each other.

An operation method of a terminal for receiving system information in a communication network, according to yet another embodiment of the present invention to achieve the above-described purpose, may comprise receiving, from a base station, a message including information on a request time of the system information and a transmission time of the system information; transmitting a message requesting the system information to the base station based on the request time; and receiving a message including the system information from the base station based on the transmission time.

Here, the information on the request time may include information on a time point at which the system information can be requested.

Here, the time point at which the system information can be requested may be one of a first time point preconfigured for requesting the system information at the at least one terminal and a second time point at which the at least one terminal can perform uplink transmission.

Here, the information on the transmission time may include one of information on a time point at which the system information is transmitted from the base station and information on at least one time period during which the system information is transmitted.

Here, the time point at which the system information is transmitted may be one of a first time point after a predetermined time from a time point of receiving the message requesting the system information at the base station and a second time point preconfigured for periodically transmitting the system information from the base station.

Here, the message including the system information may be received based on one of a time point at which the system information is transmitted and at least one time period during which the system information is transmitted, which is included in the information on the transmission time.

Here, the message including the system information, when received in the at least one time period, may be received based on a plurality of redundancy versions in the at least one time period.

Advantageous Effects

According to the present invention, a communication node serving as a base station in a communication network can effectively use radio resources by transmitting system information only when system information is required.

DETAILED DESCRIPTION OF THE INVENTION

Figure 1:
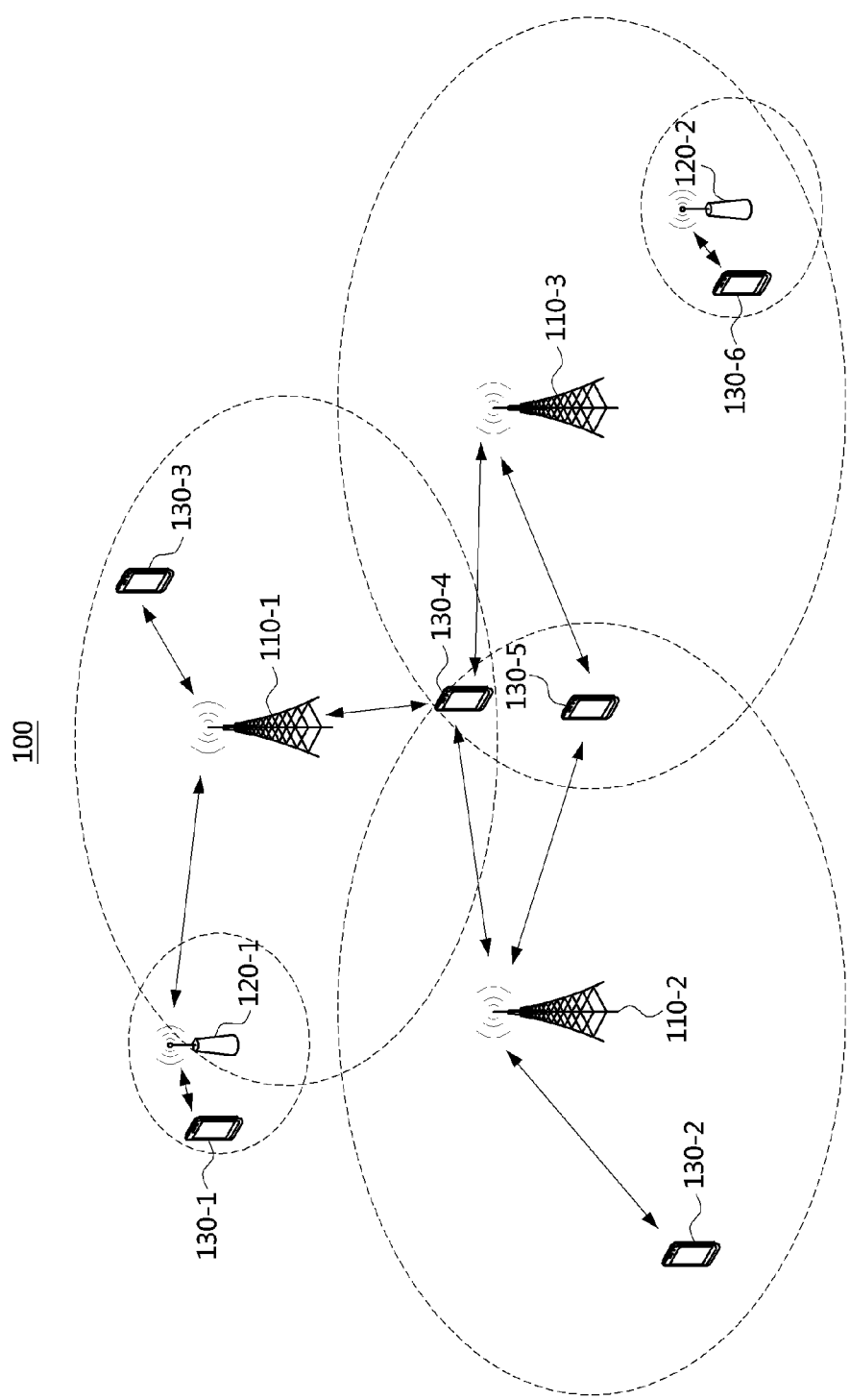
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating a first embodiment of a communication system.

Referring to FIG. 1, a communication network 100 may comprise a plurality of communication nodes 110-1, 110-2, 110-3, 120-1, 120-2, 130-1, 130-2, 130-3, 130-4, 130-5, and 130-6. Here, the communication network 100 may also be referred to as a 'communication system'. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Each of the plurality of communication nodes may have the following structure.

Figure 2:
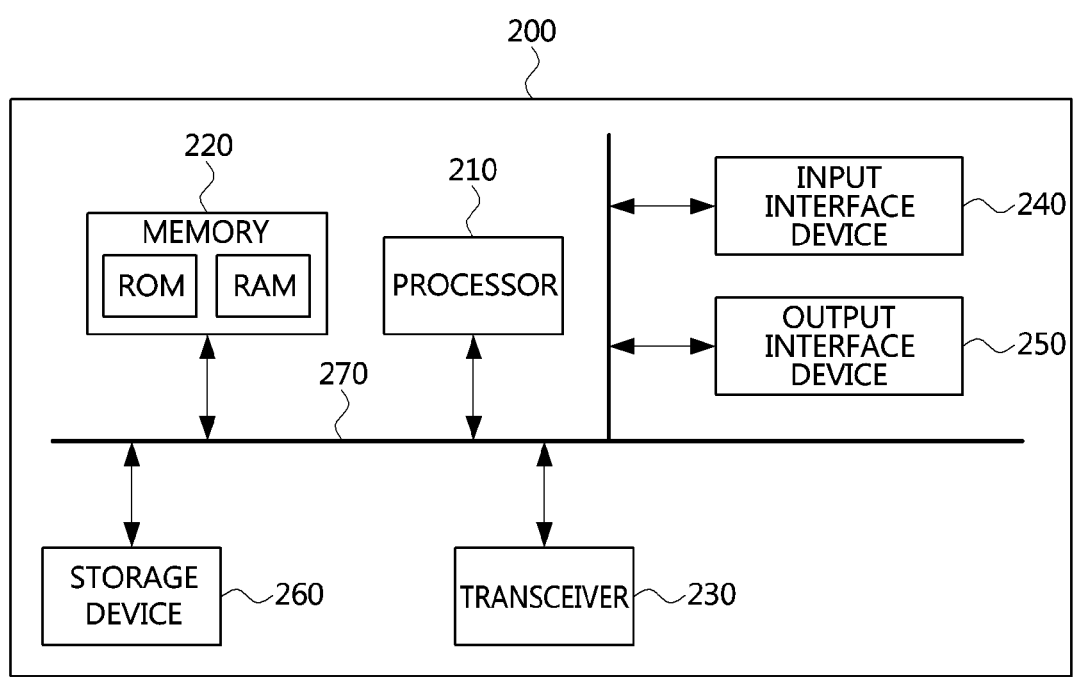
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP)

transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication network may support a frequency division duplex (FDD) mode, a time division duplex (TDD) mode, or the like. A frame based on the FDD mode may be defined as a 'type 1 frame', and a frame based on the TDD mode may be defined as a 'type 2 frame'.

Figure 3:
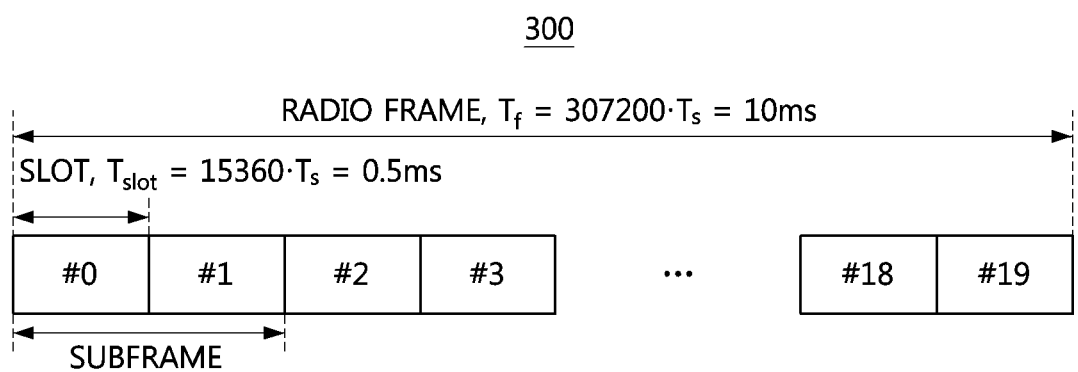
FIG. 3 is a conceptual diagram illustrating an embodiment of a type 1 frame.

FIG. 3 is a conceptual diagram illustrating an embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, . . . , slot #18, and slot #19). The length of the radio frame ($T_f$) 300 may be 10 milliseconds (ms). The length of the subframe may be 1 ms, and the length of a slot ($T_{slot}$) may be 0.5 ms. Here, $T_s$ may be 1/30,720,000 s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on the configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
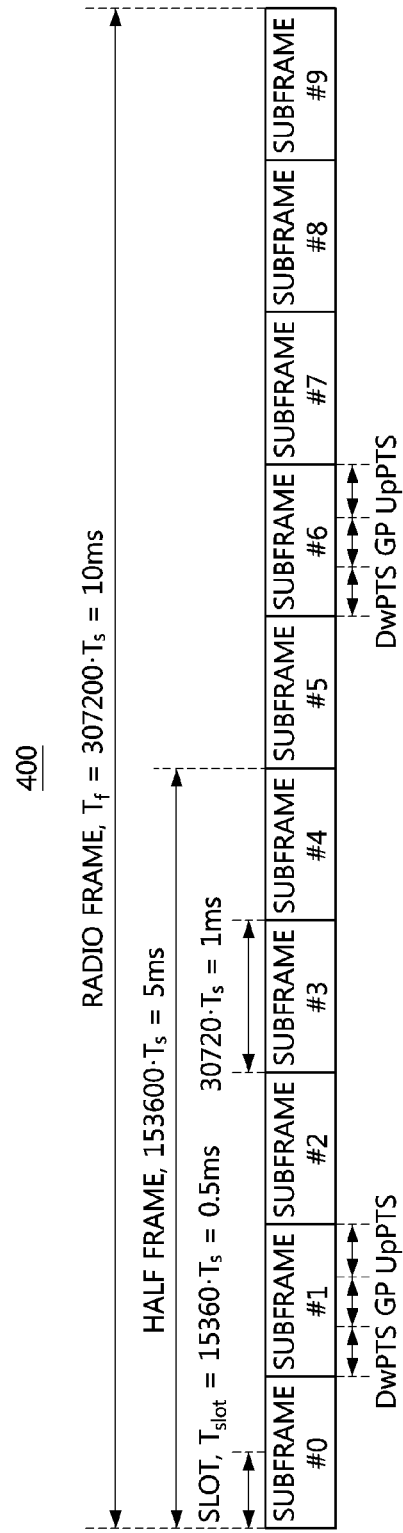
FIG. 4 is a conceptual diagram illustrating an embodiment of a type 2 frame.

FIG. 4 is a conceptual diagram illustrating an embodiment of a type 2 frame.

Referring to FIG. 4, a radio frame 400 may comprise two half frames, and a half frame may comprise 5 subframes. Thus, the radio frame 400 may comprise 10 subframes. The length ($T_f$) of the radio frame 400 may be 10 ms. The length of the half frame may be 5 ms. The length of the subframe may be 1 ms. Here, $T_s$ may be 1/30,720,000 s.

The radio frame 400 may include at least one downlink subframe, at least one uplink subframe, and a least one special subframe. Each of the downlink subframe and the uplink subframe may include two slots. The length of a slot Tslot may be 0.5 ms. Among the subframes included in the radio frame 400, each of the subframe #1 and the subframe #6 may be a special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

Figure 5:
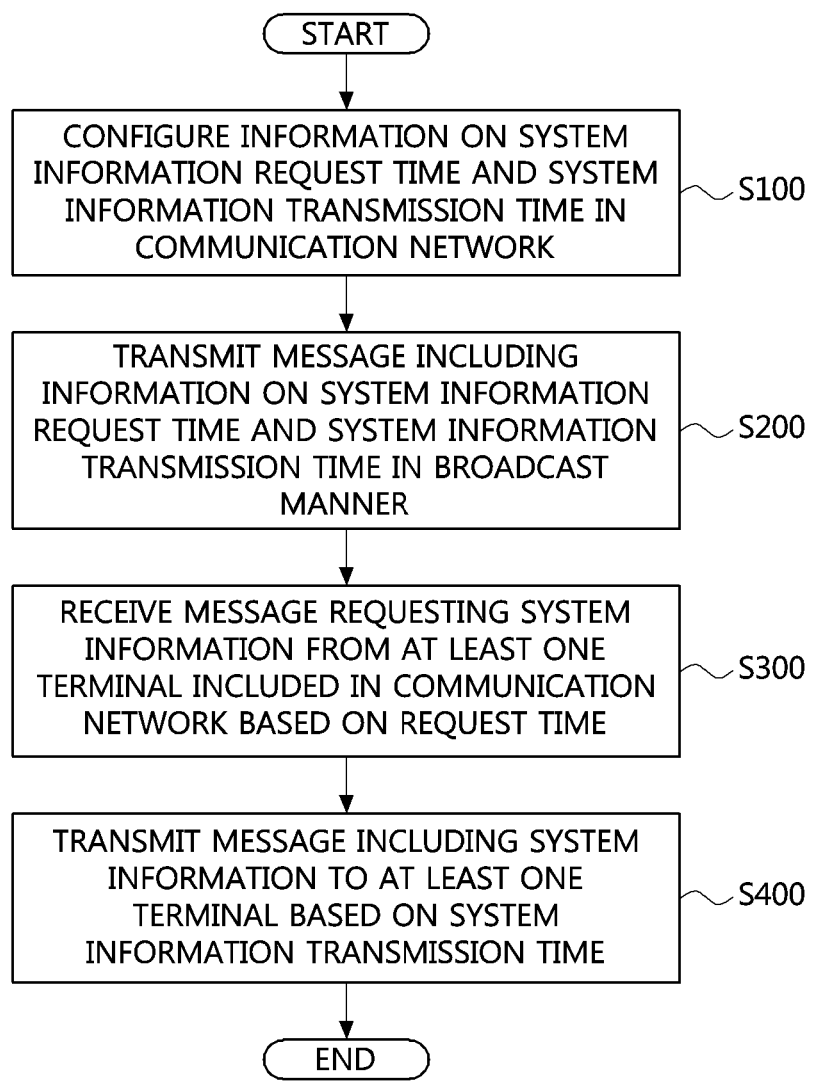
FIG. 5 is a flow chart illustrating an operation method of a communication node for transmitting system information in a communication network according to an embodiment of the present invention.

FIG. 5 is a flow chart illustrating an operation method of a communication node for transmitting system information in a communication network according to an embodiment of the present invention.

Referring to FIG. 5, a communication network according to an embodiment of the present invention may refer to a new radio (NR) communication system. The NR communication system may be a communication system that supports communications at frequencies below 6 GHz as well as above 6 GHz. As described above, an operation method for transmitting system information in a communication network according to an embodiment of the present invention may be performed in a base station. That is, a communication node that transmits system information in a communication network according to an embodiment of the present invention may refer to a base station.

First, the base station may configure information on a system information request time and a system information transmission time in the communication network (S100). Here, the information on the system information request time may include information on a system information-requestable time point at which the system information can be requested by at least one terminal included in the communication network. For example, the system information-requestable time point may one of a first time point preconfigured in the base station for requesting system information at the at least one terminal and a second time point at which at least one terminal can perform uplink transmission.

Also, the system information transmission time may include one of information on a time point at which the requested system information is transmitted by the base station and information on at least one time period (which may also be referred to as 'time window') during which the requested system information is transmitted by the base station. For example, the time point at which the system information is transmitted may be one of a first time point after a predetermined time from when a message requesting the system information is received and a second time point preconfigured for periodically transmitting the system information at the base station. Also, the at least one time period during which the system information is transmitted may be a single time period or a plurality of time periods. Here, in the case that the at least one time period is configured as the plurality of time periods, the plurality of time periods may be configured periodically or non-periodically.

Thereafter, the base station may transmit a message including the information on the system information request time and the system information transmission time in a broadcast manner (S200). Specifically, the base station may generate a message including information on the system information-requestable time point at which the system information can be requested by at least one terminal included in the communication network, and information on the transmission time at which the system information is transmitted by the base station. Then, the base station may transmit the message including the information on the system information request time and the information on the system information transmission time in a broadcast manner.

For example, the message including the information on the system information request time and the information on the system information transmission time may be a message including minimum system information (i.e., minimum-SI) necessary for at least one terminal included in the communication network. That is, the information on the system information request time and the information on the system information transmission time may be periodically transmitted as included in the minimum SI transmitted by the base station. Also, the information on the system information request time and the information on the system information transmission time may be transmitted as included in information configuring RRC parameters for at least one terminal.

Accordingly, at least one terminal included in the communication network may receive the message including the information on the system information request time and the information on the system information transmission time which is transmitted from the base station in the broadcast manner. Then, at least one terminal included in the communication network may transmit to the base station a message requesting system information based on the system information request time. Specifically, at least one terminal may identify the system information-requestable time point from the information on the system information request time. Thereafter, at least one terminal may transmit a message requesting system information to the base station based on the identified time point.

That is, in the case that the time point indicated by the information on the system information request time is the first time point (i.e., the time point preconfigured in the base station for requesting system information at the at least one terminal), at least one terminal may transmits the message requesting system information at the first time point. On the other hand, in the case that the time point indicated by the information on the request time is the second time point (i.e., the time point at which at least one terminal can perform uplink transmission), at least one terminal may transmits the message requesting system information at the second time point.

Here, the message requesting system information transmitted from at least one terminal included in the communication network may be in a form of a scheduling request (SR) message, a RACH preamble, or the like which is transmitted by the at least one terminal. Alternatively, the message requesting system information transmitted from at least one terminal may be a separate message generated for requesting system information. For example, when the message requesting system information transmitted from at least one terminal is transmitted based on a RACH preamble, the RACH preamble may be a contention-free RACH preamble.

Then, the base station may receive the message requesting system information based on the system information request time from at least one terminal (S300). That is, the message requesting system information received at the base station may be received at one of the first time point and the second time point indicated by the information on the system information request time.

Then, the base station may transmit a message including the system information to at least one terminal based on the system information transmission time (S400). Specifically, in the case that the system information transmission time is configured as the time point at which the system information is transmitted, the base station may transmit to at least one terminal the message including the requested system information at one of the first time point and the second time point.

On the other hand, in the case that the system information transmission time is configured as at least one time period during which the system information is transmitted, the base station may transmit the message including the system information to at least one terminal in the configured at least one period. In this case, the base station may transmit the message including the requested system information to at least one terminal based on a plurality of redundancy versions in the at least one time period.

Accordingly, at least one terminal may receive the message including the system information from the base station based on the system information transmission time. That is, the message including the system information may be received at the time point or in the at least one time period indicated by the system information transmission time. Specifically, the at least one terminal may perform monitoring on reception of system information at the time point or in the at least one time period indicated by the system information transmission time. For example, the at least one terminal may monitor a system information-RNTI (SI-RNTI) of a physical downlink control channel (PDCCH) from the base station.

For example, in the case that the system information transmission time indicates the at least one time period, the at least one terminal may receive the message including the system information in the at least one time period indicated by the system information transmission time. In this case, the at least one terminal may receive the message including the system information based on the plurality of redundancy versions in the at least one time period.

Meanwhile, in the communication network according to an embodiment of the present invention described with reference to FIG. 5, the base station transmitting the system information was described as configuring the system information request time to be the first time point or the second time point (i.e., the time point at which at least one terminal can perform uplink transmission). However, the base station may not configure the system information request time explicitly as the first time point or the second time point.

In this case, the base station may configure only the information on the system information transmission time in the step S100, and may transmit the message including only the information on the system information transmission time in the broadcast manner in the step S200. Accordingly, at least one terminal may not obtain the information on the system information request time. In this case, at least one terminal may transmit the message requesting system information to the base station at the time point at which the at least one can perform uplink transmission, which is identical to the second time point described with reference to FIG. 5.

Hereinafter, a plurality of embodiments (first to sixth embodiments) of an operation method of a communication node for transmitting system information in the communication network according to an embodiment of the present invention described with reference to FIG. 5 will be specifically described with reference to FIGS. 6 to 11.

Figure 6:
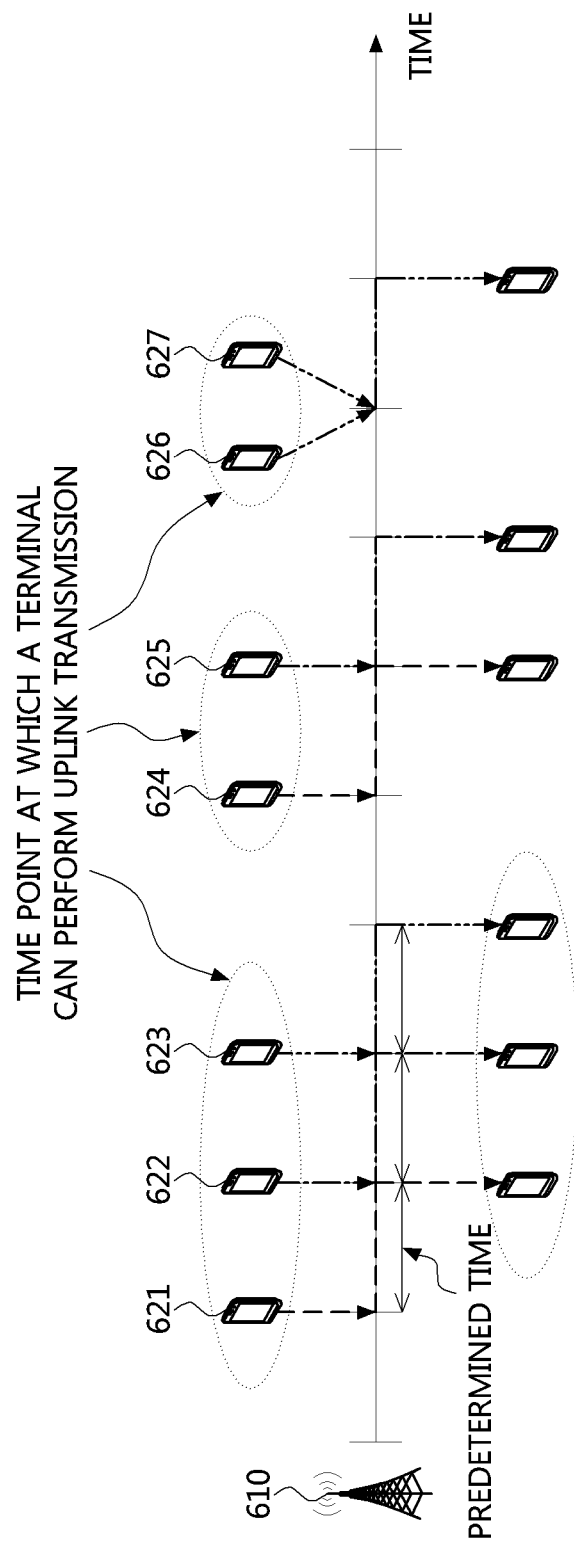
FIG. 6 is a conceptual diagram illustrating a first embodiment of an operation method of a communication node for transmitting system information in a communication network according to an embodiment of the present invention.

FIG. 6 is a conceptual diagram illustrating a first embodiment of an operation method of a communication node for transmitting system information in a communication network according to an embodiment of the present invention.

Referring to FIG. 6, a communication network according to an embodiment of the present invention may comprise a base station 610 transmitting system information and a plurality of terminals 621 to 627. The plurality of terminals may include a first terminal 621, a second terminal 622, a third terminal 623, a fourth terminal 624, a fifth terminal 625, a sixth terminal 626, and a seventh terminal 627. The base station 610 and the plurality of terminals 621 to 627 included in the communication network may refer to the base station and the terminals described with reference to FIG. 1, and may have a structure similar as or identical to the structure of the communication node described with reference to FIG. 2.

First, in the communication network, the plurality of terminals 621 to 627 may generate a message requesting system information, and transmit the message requesting system information to the base station 610. Specifically, each of the plurality of terminals 621 to 627 may transmit the message requesting system information to the base station 610 at a time point at which each of the plurality of terminals 621 to 627 can perform uplink transmission. That is, the message requesting system information is transmitted at the time point at which each of the plurality of terminals can perform uplink transmission, which may mean that the system information-requestable time point is not configured in advance, or that the time point at which each of the plurality of terminals can perform uplink transmission is configured as the system information-requestable time point.

Accordingly, the base station 610 may receive the message requesting system information from each of the plurality of terminals 621 to 627 at the time point when each of the plurality of terminals 621 to 627 can perform uplink transmission. Then, the base station 610 may transmit a message including the system information to each terminal at a time point after a predetermined time from when the message requesting system information is received. That is, the message including the system information is transmitted at the time point after a predetermined time from the reception of the message requesting system information, which may mean that the time point at which the system information is transmitted is configured as the first time point corresponding to the system information transmission time described with reference to FIG. 5.

For example, the base station 610 may receive the message requesting system information from the first terminal 621 at a first time point. Then, the base station 610 may transmit a message including the system information to the first terminal 621 at a second time point after a predetermined time from the first time point when the message requesting system information is received from the first terminal 621. Also, the base station 610 may receive the message requesting system information from the second terminal 622 at a third time point. Then, the base station 610 may transmit a message including the system information to the second terminal 622 at a fourth time point after a predetermined time from the third time point when the message requesting system information is received from the second terminal 622. Through the above-described manner, the base station 610 may transmit a message including system information to each of the plurality of terminals 621 to 627.

Figure 7:
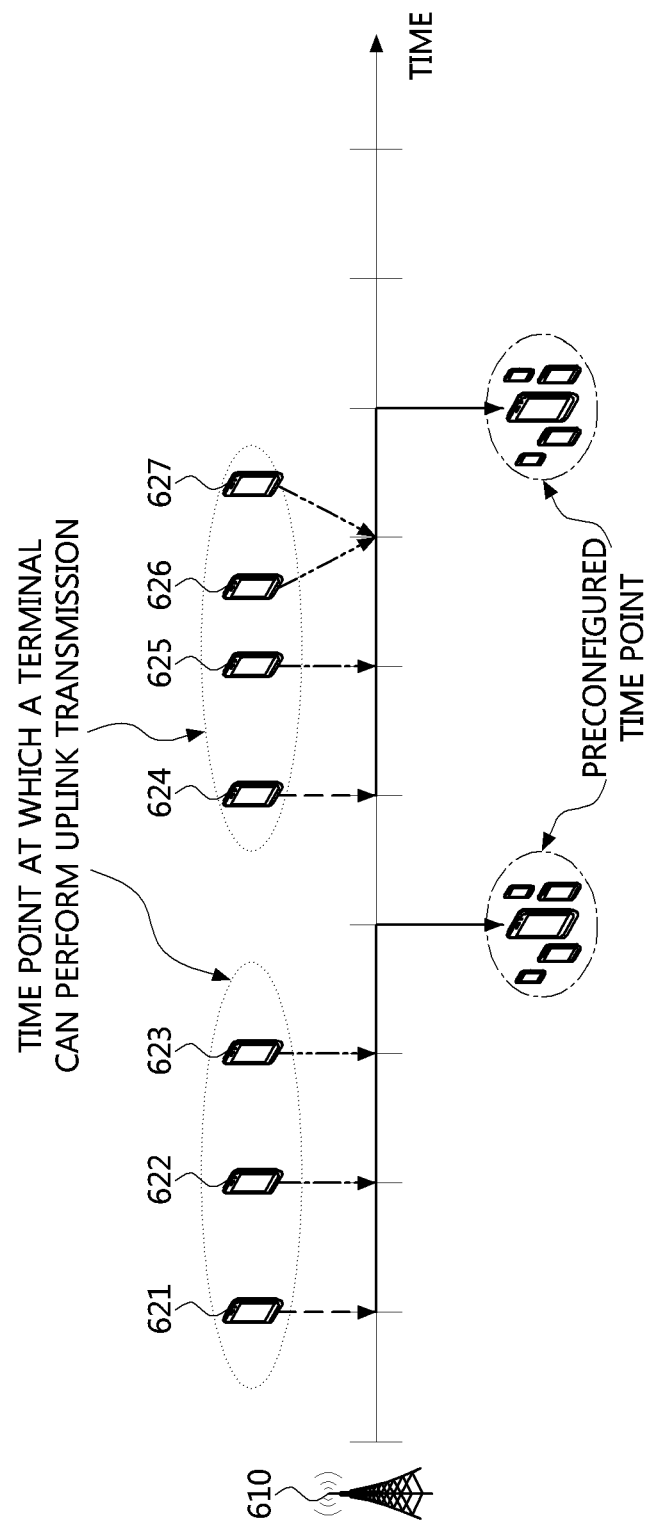
FIG. 7 is a conceptual diagram illustrating a second embodiment of an operation method of a communication node for transmitting system information in a communication network according to an embodiment of the present invention.

FIG. 7 is a conceptual diagram illustrating a second embodiment of an operation method of a communication node for transmitting system information in a communication network according to an embodiment of the present invention.

Referring to FIG. 7, a communication network according to an embodiment of the present invention may include the base station 610 transmitting system information and the plurality of terminals 621 to 627, as described with reference to FIG. 6. First, each of the plurality of terminals 621 to 627 included in the communication network may generate a message requesting system information, and transmit the message requesting system information to the base station 610. Specifically, each of the plurality of terminals 621 to 627 may transmit the message requesting system information to the base station 610 at a time point when each of the plurality of terminals 621 to 627 can perform uplink transmission. That is, the message requesting system information is transmitted at the time point at which each of the plurality of terminals can perform uplink transmission, which may mean that the system information-requestable time point is not configured in advance, or that the time point at which each of the plurality of terminals can perform uplink transmission is configured as the system information-requestable time point, as described with reference to FIG. 6.

Accordingly, the base station 610 may receive the message requesting system information from each of the plurality of terminals 621 to 627 at the time point when each of the plurality of terminals 621 to 627 can perform uplink transmission. Then, the base station 610 may transmit a message including the system information to each terminal at a time point preconfigured as the time point at which the system information is transmitted. That is, the message including the system information is transmitted at the time point preconfigured as the time point at which the system information is transmitted, which may mean that the time point at which the system information is transmitted is configured as the second time point corresponding to the system information transmission time described with reference to FIG. 5.

For example, each of the first terminal 621, the second terminal 622, and the third terminal 623 may generate the message requesting system information and transmit the message to the base station 610 at the time point at which each of the first terminal 621, the second terminal 622, and the third terminal 623 can perform uplink transmission. Accordingly, the base station 610 may sequentially receive the messages requesting system information from the first terminal 621, the second terminal 622, and the third terminal 623 at the time points at which the first terminal 621, the second terminal 622, and the third terminal 623 respectively can perform uplink transmission. Then, the base station 610 may transmit a message including the system information to the first terminal 621, the second terminal 622, and the third terminal 622 at a preconfigured time point when a predetermined time for transmitting the system information has elapsed.

Then, each of the fourth terminal 624, the fifth terminal 625, the sixth terminal 626 and the seventh terminal 627 may generate a message requesting system information, and transmit the message to the base station 610 at the time point at which each the fourth terminal 624, the fifth terminal 625, the sixth terminal 626 and the seventh terminal 627 can perform uplink transmission. Accordingly, the base station 610 may sequentially receive the messages requesting system information from the fourth terminal 624, the fifth terminal 625, the sixth terminal 626 and the seventh terminal 627 at the time points at which the fourth terminal 624, the fifth terminal 625, the sixth terminal 626 and the seventh terminal 627 can perform uplink transmission. Then, the base station 610 may transmit a message including the system information to the fourth terminal 624, the fifth terminal 625, the sixth terminal 626 and the seventh terminal 627 at a preconfigured time point when the predetermined time for transmitting the system information has elapsed. Through the above-described manner, the base station 610 may transmit a message including system information to each of the plurality of terminals 621 to 627.

Figure 8:
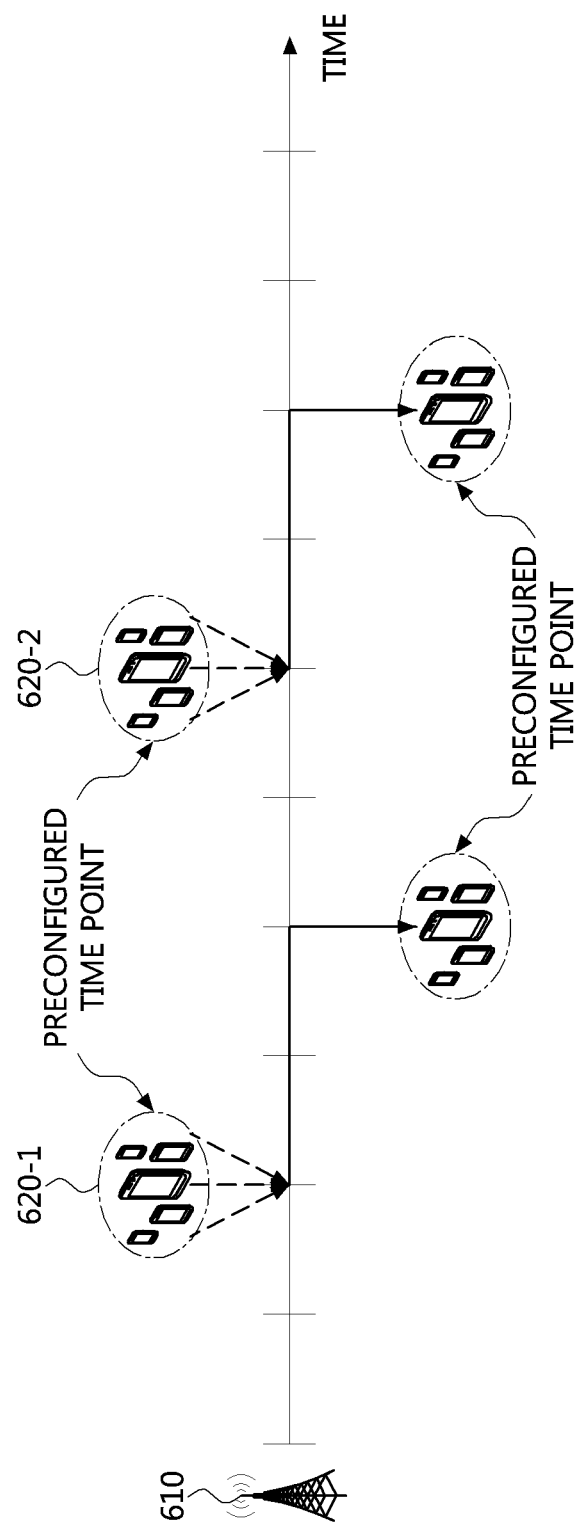
FIG. 8 is a conceptual diagram illustrating a third embodiment of an operation method of a communication node for transmitting system information in a communication network according to an embodiment of the present invention.

FIG. 8 is a conceptual diagram illustrating a third embodiment of an operation method of a communication node for transmitting system information in a communication network according to an embodiment of the present invention.

Referring to FIG. 8, a communication network according to an embodiment of the present invention may include the base station 610 transmitting system information, and a first group 620-1 and a second group 620-2 each of which is composed of at least one terminal. For example, the first group 620-1 may include the first terminal 621, the second terminal 622, and the third terminal 623 described with reference to FIGS. 6 and 7. Also, the second group 620-2 may include the fourth terminal 624, the fifth terminal 625, the sixth terminal 626, and the seventh terminal 627 described with reference to FIGS. 6 and 7.

First, each of the first terminal 621, the second terminal 622, and the third terminal 623 included in the first group 620-1 may generate a message requesting system information and transmit the message requesting system information to the base station 610 at a time point preconfigured as the system information-requestable time point. That is, the message requesting system information is transmitted at the preconfigured time point, which may mean that the system information-requestable time point is configured by the base station 610 in advance, and that the information on the preconfigured time point is obtained from the base station 610.

Accordingly, the base station 610 may receive the messages requesting system information from the first terminal 621, the second terminal 622, and the third terminal 623 included in the first group 620-1 at a time point preconfigured as the system information-requestable time point. Then, the base station 610 may generate a message including the system information and transmit the message to the first terminal 621, the second terminal 622, and the third terminal 623 included in the first group 620-1 at a time point preconfigured as the transmission time point of the system information.

Through the above-described manner, the base station 610 may receive the messages requesting system information from the fourth terminal 624, the fifth terminal 625, the sixth terminal 626, and the seventh terminal 627 included in the second group 620-2 at a time point preconfigured as the system information-requestable time point. Then, the base station 610 may transmit a message including the system information to the fourth terminal 624, the fifth terminal 625, the sixth terminal 626, and the seventh terminal 627 included in the second group 620-2 at a time point preconfigured as the transmission time point of the system information.

Figure 9:
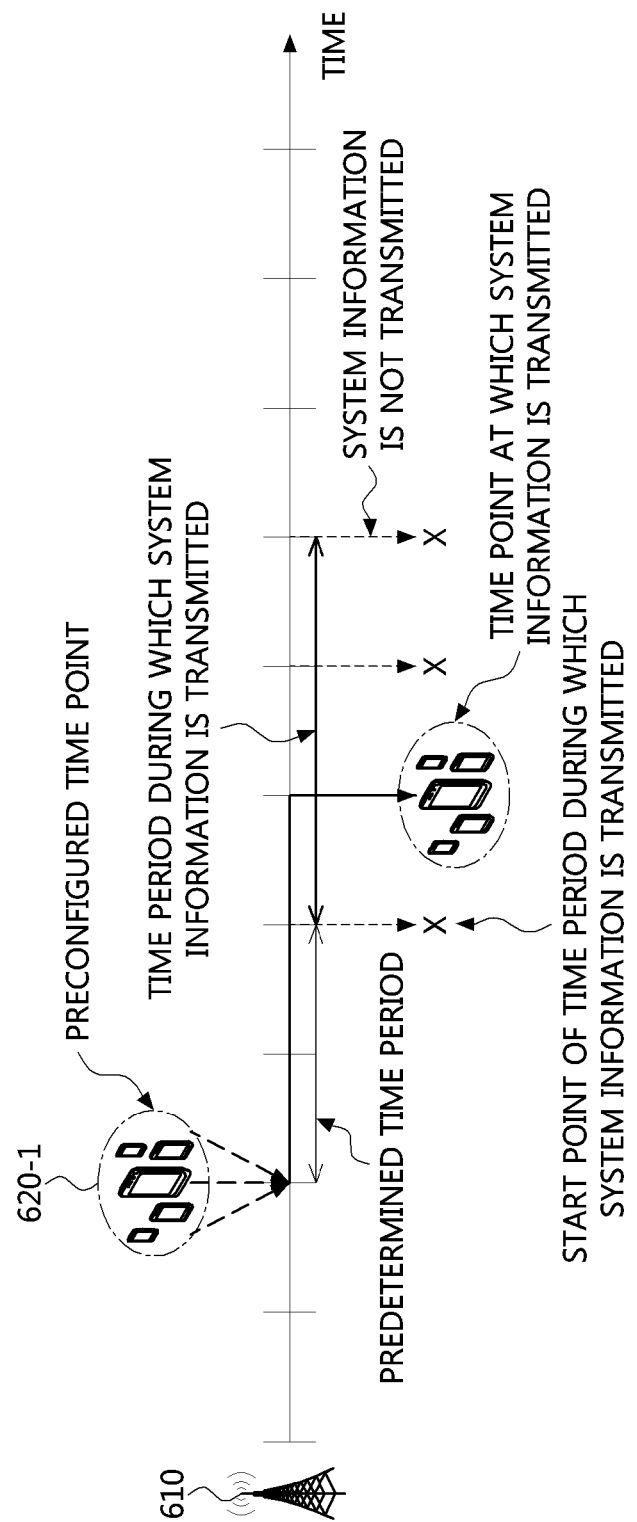
FIG. 9 is a conceptual diagram illustrating a fourth embodiment of an operation method of a communication node for transmitting system information in a communication network according to an embodiment of the present invention.

FIG. 9 is a conceptual diagram illustrating a fourth embodiment of an operation method of a communication node for transmitting system information in a communication network according to an embodiment of the present invention.

Referring to FIG. 9, a communication network according to an embodiment of the present invention may include the base station 610 transmitting system information and a first group 620-1 composed of at least one terminal. For example, the first group 620-1 may include the first terminal 621, the second terminal 622, and the third terminal 623 described with reference to FIGS. 6 and 7.

First, each of the first terminal 621, the second terminal 622, and the third terminal 623 included in the first group 620-1 may generate a message requesting system information and transmit the message requesting system information to the base station 610 at a time point preconfigured as the system information-requestable time point. That is, the message requesting system information is transmitted at the preconfigured time point, which may mean that the system information-requestable time point is configured by the base station 610 in advance, and that the information on the preconfigured time point is obtained from the base station 610.

Accordingly, the base station 610 may receive the messages requesting system information from the first terminal 621, the second terminal 622, and the third terminal 623 included in the first group 620-1 at the time point preconfigured as the system information-requestable time point. Then, the base station 610 may generate a message including the system information and transmit the message to the first terminal 621, the second terminal 622, and the third terminal 623 included in the first group 620-1 in a time period preconfigured as the time period during which the system information is transmitted (a case in which a single time period is configured is shown in FIG. 9).

Specifically, the time period during which the system information is transmitted by the base station 610 may be started from a predetermine time period after the time point at which the messages requesting system information have been received from the first terminal 621, the second terminal 622, and the third terminal 623 included in the first group 620-1. Here, the base station 610 may transmit the message including the system information at an arbitrary point within the time period during which the system information is transmitted.

However, if a downlink resource for transmitting the message including the system information is not secured, the base station 610 may transmit the message including the system information at a time point when a downlink resource for transmitting the message is secured within the time period during which the system information is transmitted. That is, the time point at which the system information is actually transmitted at the base station 610 may indicate the time point when the downlink resource is secured.

Also, the base station 610 may transmit the message including the system information based on a plurality of redundancy versions in at least one time period preconfigured as the time period during which system information is transmitted. Accordingly, the first terminal 621, the second terminal 622, and the third terminal 623 included in the first group 620-1 can acquire the system information even when only one of the plurality of redundancy versions of the message including the system information is successfully received.

Meanwhile, in the communication network according to an embodiment of the present invention, the base station 610 may configure a plurality of time periods through which system information is transmitted. In this case, the base station 610 may configure the plurality of time periods based on a predetermined periodicity. That is, the plurality of time periods may be periodically configured based on the predetermined periodicity. Here, the base station 610 may transmit the message including system the information based on the plurality of redundancy versions in each of the plurality of time periods.

For example, the base station 610 may transmit the message including the system information based on a first redundancy version in a first time period of the plurality of time periods. Also, the base station 610 may transmit the message including the system information based on a second redundancy version different from the first redundancy version in a second time period, which is a time period after the first time period, among the plurality of time periods. That is, the base station 610 may transmit the message including the system information based on different redundancy versions over the plurality of time periods.

Figure 10:
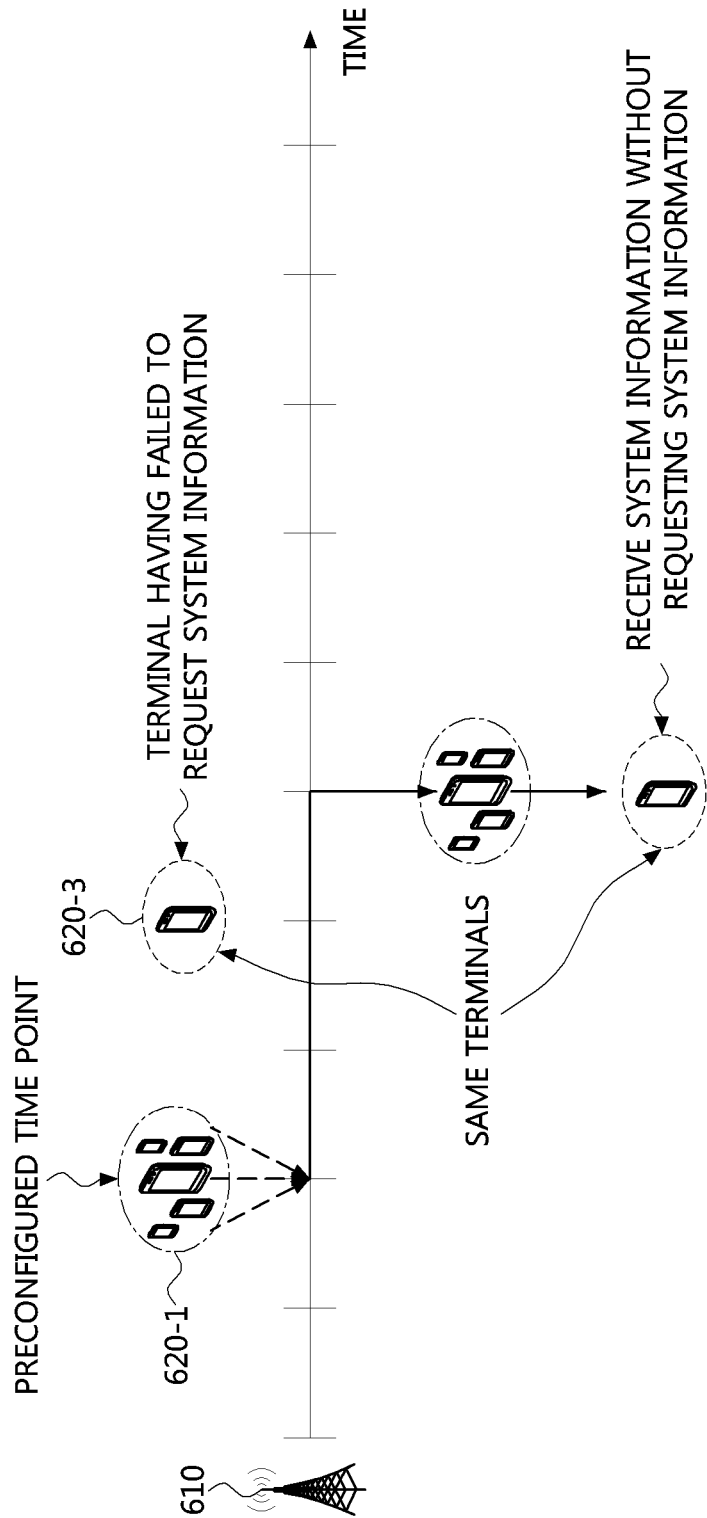
FIG. 10 is a conceptual diagram illustrating a fifth embodiment of an operation method of a communication node for transmitting system information in a communication network according to an embodiment of the present invention.

FIG. 10 is a conceptual diagram illustrating a fifth embodiment of an operation method of a communication node for transmitting system information in a communication network according to an embodiment of the present invention.

Referring to FIG. 10, a communication network according to an embodiment of the present invention may include the base station 610 transmitting system information and a first group 620-1 composed of at least one terminal. For example, the first group 620-1 may include the first terminal 621, the second terminal 622, and the third terminal 623 described with reference to FIGS. 6 and 7.

First, each of the first terminal 621, the second terminal 622, and the third terminal 623 included in the first group 620-1 may generate a message requesting system information and transmit the message requesting system information to the base station 610 at a time point preconfigured as the system information-requestable time point. At this time, among the plurality of terminals included in the communication network, a terminal (e.g., the terminal 620-3) which failed to request the system information at the preconfigured time point may exist. Meanwhile, the message requesting system information is transmitted at the preconfigured time point, which may mean that the system information-requestable time point is configured by the base station 610 in advance, and that the information on the preconfigured time point is obtained from the base station 610.

Accordingly, the base station 610 may receive the messages requesting system information from the first terminal 621, the second terminal 622, and the third terminal 623 included in the first group 620-1 at a time point preconfigured as the system information-requestable time point. Then, the base station 610 may generate a message including the system information and transmit the message to the first terminal 621, the second terminal 622, and the third terminal 623 included in the first group 620-1 at a time point preconfigured as the system information-requestable time point.

Here, although the terminal 620-3 failed to request the system information to the base station 610, if information on a time point at which the message including the system information is transmitted is obtained in advance, the terminal 620-3 may receive the message including the system information from the base station 610. Through the above-described manner, in the communication network, the terminal having failed to request the system information to the base station 610 may also receive the message including the system information from the base station 610.

Figure 11:
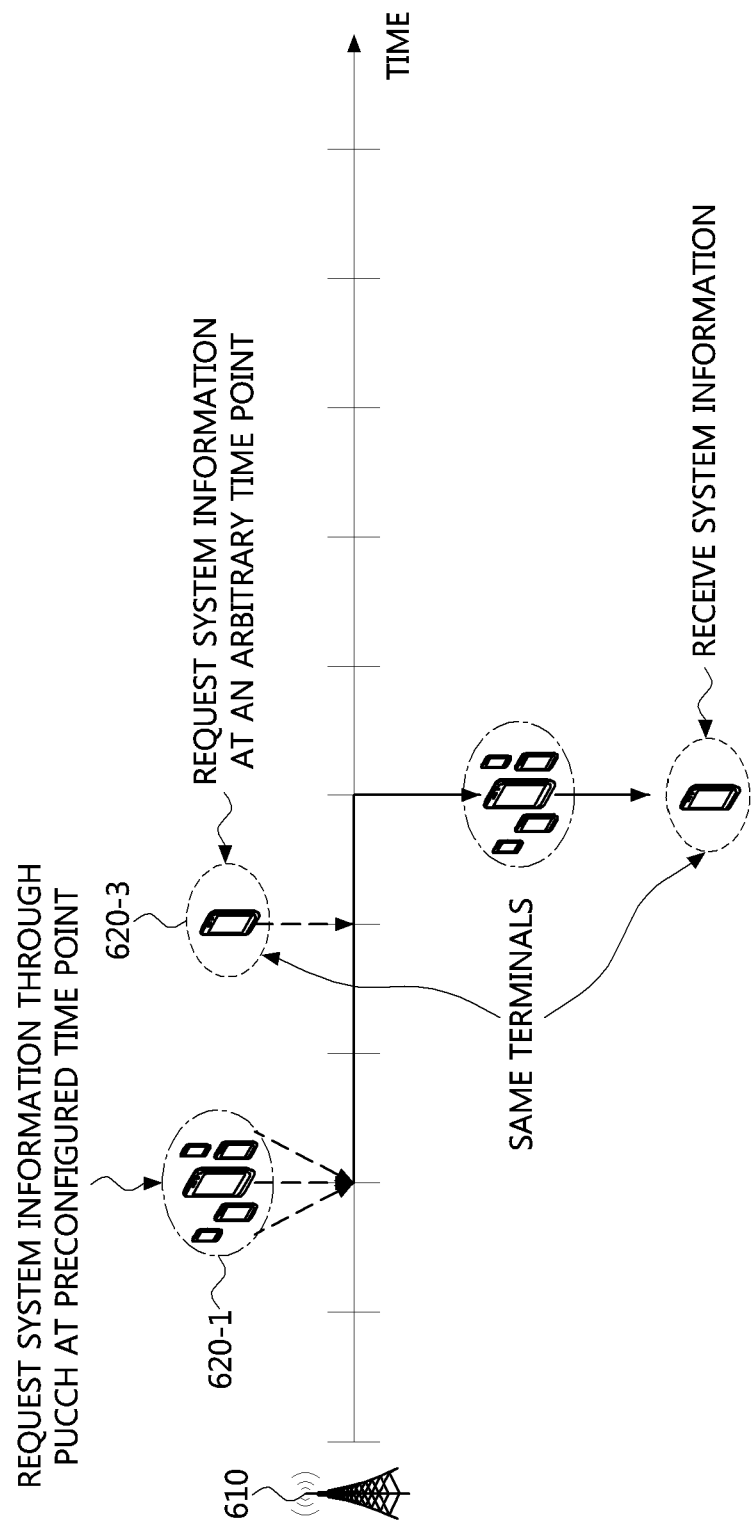
FIG. 11 is a conceptual diagram illustrating a sixth embodiment of an operation method of a communication node for transmitting system information in a communication network according to an embodiment of the present invention.

FIG. 11 is a conceptual diagram illustrating a sixth embodiment of an operation method of a communication node for transmitting system information in a communication network according to an embodiment of the present invention.

Referring to FIG. 11, a communication network according to an embodiment of the present invention may include the base station 610 transmitting system information and a first group 620-1 composed of at least one terminal. For example, the first group 620-1 may include the first terminal 621, the second terminal 622, and the third terminal 623 described with reference to FIGS. 6 and 7.

First, each of the first terminal 621, the second terminal 622, and the third terminal 623 included in the first group 620-1 may generate a message requesting system information and transmit the message requesting system information to the base station 610 at a time point preconfigured as the system information-requestable time point. Here, a scheduling request message transmitted through a PUCCH that is an uplink control channel may be used as the message requesting system information at the preconfigured time point. That is, the system information requested at the preconfigured time point may be requested through the scheduling request message through the PUCCH which is an uplink control channel.

Accordingly, the base station 610 may receive the messages requesting system information from the first terminal 621, the second terminal 622, and the third terminal 623 included in the first group 620-1 at a time point preconfigured as the system information-requestable time point. At this time, among the plurality of terminals included in the communication network, a terminal (e.g., a terminal 620-3) having failed to request the system information at the preconfigured time point may exist. The terminal 620-3, which has failed to request the system information, may request the system information at an arbitrary time point that is not the system information-requestable time point. For example, in the case of requesting the system information at an arbitrary time point that is not the system information-requestable time point, the terminal having failed to request the system information may transmit a message requesting system information in a piggyback manner through a PUSCH which is an uplink data channel.

Accordingly, the base station 610 may receive the message requesting system information from the terminal having failed to request the system information. Then, the base station 610 may generate a message including the system information and transmit the message to the first terminal 621, the second terminal 622, and the third terminal 623 included in the first group 620-1, and the terminal 620-3 having failed to request the system information at a time point preconfigured as the time point at which the system information is transmitted.

Through the above-described manner, in the case that the plurality of terminals included in the communication network transmit the messages requesting system information at the preconfigured time point, each of the plurality terminals may transmit to the base station 610 the message requesting system information by using a PUCCH which is an uplink control channel. Also, in the case that the plurality of terminals included in the communication network transmit the messages requesting system information at arbitrary time points, each of the plurality terminals may transmit to the base station 610 the message requesting system information by using a PUSCH which is an uplink data channel.

Meanwhile, the terminal 620-3 which has failed to request the system information in the communication network according to an embodiment of the present invention has been described as requesting the system information by using a PUSCH, but the embodiment is not necessarily limited thereto. That is, at least one of the plurality of terminals included in the communication network according to an embodiment of the present invention, other than the terminal 620-3 that has failed to request the system information, may transmit to the base station 610 the message requesting system information by using a PUSCH.

Figure 12:
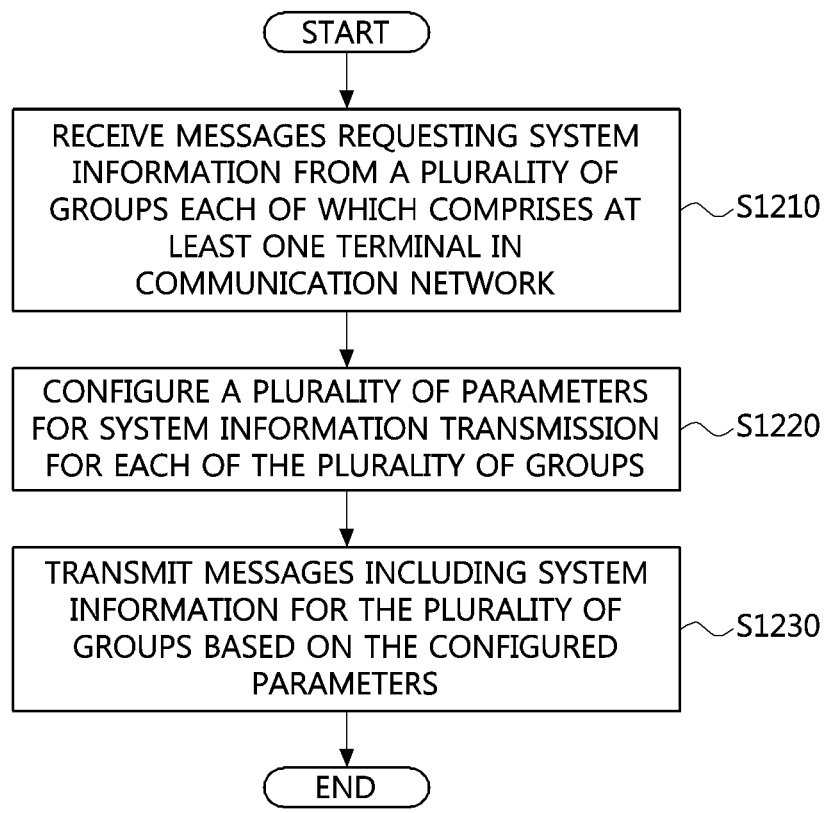
FIG. 12 is a flow chart illustrating an operation method of a communication node for transmitting system information in a communication network according to another embodiment of the present invention.

FIG. 12 is a flow chart illustrating an operation method of a communication node for transmitting system information in a communication network according to another embodiment of the present invention.

Referring to FIG. 12, a communication network according to another embodiment of the present invention may be identical to the communication network described with reference to FIG. 5. That is, the communication network according to another embodiment of the present invention may refer to the NR communication system that supports communications at frequencies below 6 GHz as well as above 6 GHz. As described above, an operation method for transmitting system information in a communication network according to another embodiment of the present invention may be performed in a base station. That is, a communication node that transmits system information in a communication network according to another embodiment of the present invention may refer to a base station.

First, the base station may receive messages requesting system information from a plurality of groups each of which includes at least one terminal in the communication network (S1210). Here, the plurality of groups may include a first group including at least one terminal and a second group including at least one terminal. Also, the plurality of groups may be distinguished according to system information-requestable time points configured for the at least one terminal belonging to the respective groups. For example, each of the at least one terminal included in the first group may be a terminal which is capable of requesting system information at a first time point and requires first system information-requestable at the first time point. Also, each of the at least one terminal included in the second group may be a terminal which is capable of requesting system information at a second time point and requires second system information-requestable at the second time point. Here, the at least one terminal included in the first group and the at least one terminal included in the second group may be the same or different from each other.

That is, the message requesting system information is transmitted at the preconfigured time point, which may mean that the system information-requestable time point is configured by the base station 610 in advance, and that the information on the preconfigured time point is obtained by the plurality of terminals included in the communication network from the base station 610. For example, the base station may preconfigure the first time point for requesting the first system information and the second time point for requesting the second system information. Then, the base station may transmit, in advance, information on the preconfigured time points for request system information (i.e., information on the system information request time) to the plurality of terminals included in the communication network.

Also, a resource used for transmitting a message requesting system information may be preconfigured by the base station, and information on the preconfigured resource may be transmitted in advance to the plurality of terminals included in the communication network. For example, the resource used for transmitting the message requesting system information may be a RACH preamble, and the information on the preconfigured resource may be transmitted together with information on the time point preconfigured for requesting system information.

Specifically, in the case that the first time point for requesting the first system information and the second time point for requesting the second system information are configured to be the same, the base station may configure a RACH preamble used for requesting the first system information and a second RACH preamble used for requesting the second system information to be different from each other. Also, in the case that the first time point for requesting the first system information and the second time point for requesting the second system information are configured to be different, the base station may configure a RACH preamble used for requesting the first system information and a second RACH preamble used for requesting the second system information to be the same as each other. Accordingly, the messages requesting system information from the plurality of groups may be received based on the information on the preconfigured time points and the information on the resource for requesting system information.

Then, the base station may configure a plurality of parameters for transmitting system information for each of the plurality of groups (S1220). The plurality of parameters configured by the base station may include at least one identifier used for transmitting the system information and at least one transmission time at which the system information is transmitted. Here, the identifier may be a SI-RNTI used for transmitting the system information. Specifically, the base station may configure the transmission times and identifiers for the first system information for the first group and the second system information for the second group so that the first system information and the second system information can be distinguished from each other.

For example, in the case that the transmission time of the first system information and the transmission time of the second system information are configured to be the same, the base station may configure the identifiers of the first system information and the second system information to be different from each other. On the other hand, in the case that the transmission time of the first system information and the transmission time of the second system information are configured to be different from each other, the base station may configure the identifiers of the first system information and the second system information to be the same.

Thereafter, the base station may transmit messages including system information for the plurality of groups based on the configured parameters (S1230). Specifically, in the case that the transmission time of the first system information and the transmission time of the second system information are configured to be the same, the base station may generate messages which respectively includes the first system information and the second system information that have the different identifiers, and transmit the generated messages. On the other hand, in the case that the transmission time of the first system information and the transmission time of the second system information are configured to be different from each other, the base station may generate messages which respectively includes the first system information and the second system information that have the same identifier, and transmit the generated messages.

Accordingly, at least one terminal included in each of the plurality of groups may receive the message including the system information transmitted from the base station. Here, in the case that the transmission time of the first system information for the first group and the transmission time of the second system information for the second group are configured to be the same, the base station may monitor the SI-RNTIs used for transmitting the system information, thereby identifying the system information.

In the communication network according to another embodiment of the present invention described with reference to FIG. 12, the base station transmitting system information has been describing as configuring the transmission times of the system information after receiving the message requesting system information from the plurality of groups. However, the embodiment is not limited thereto. That is, the base station may also configure the information on the system information transmission times (e.g., information on whether the transmission times of the system information are the same or not), and transmit the information on the transmission times to the plurality of terminals, before receiving the message requesting system information from the plurality of groups. Hereinafter, the embodiment in which system information is transmitted at different transmission times in the operation method described with reference to FIG. 12 will be described in detail with reference to FIG. 13.

Figure 13:
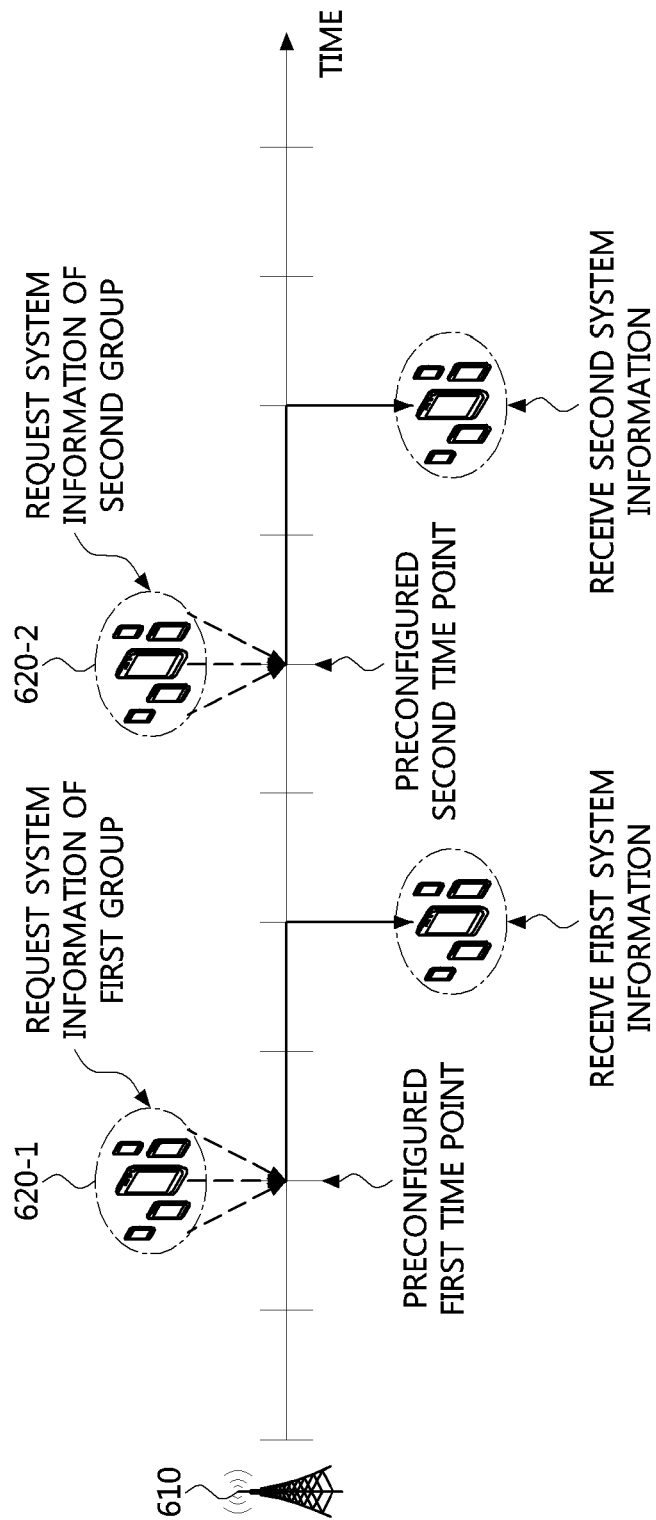
FIG. 13 is a conceptual chart illustrating an operation method of a communication node for transmitting system information in a communication network according to another embodiment of the present invention.

FIG. 13 is a conceptual chart illustrating an operation method of a communication node for transmitting system information in a communication network according to another embodiment of the present invention.

Referring to FIG. 13, a communication network according to another embodiment of the present invention may be the same as the communication network described with reference to FIG. 8. That is, the communication network according to another embodiment of the present invention may include the base station 610 transmitting system information, and a first group 620-1 and a second group 620-2 each of which is composed of at least one terminal. For example, the first group 620-1 may include the first terminal 621, the second terminal 622, and the third terminal 623 described with reference to FIGS. 6 and 7. Also, the second group 620-2 may include the fourth terminal 624, the fifth terminal 625, the sixth terminal 626, and the seventh terminal 627 described with reference to FIGS. 6 and 7. Although at least one terminal included in the first group 620-1 and at least one terminal included in the second group 620-2 are described as being different, the embodiment is not limited thereto. That is, at least one terminal included in the first group 620-1 and at least one terminal included in the second group 620-2 may be the same terminal or a portion of the groups may be the same.

That is, at least one terminal included in the first group 620-1 may be in a state in which information on the preconfigured first time point at which the first system information can be requested is acquired in advance, and may be terminals requiring the first system information. Also, at least one terminal included in the second group 620-2 may be in a state in which information on the preconfigured second time point at which the second system information can be requested is acquired in advance, and may be terminals requiring the second system information.

First, the first terminal 621, the second terminal 622, and the third terminal 623 included in the first group 620-1 may generate messages requesting the first system information, and transmit the message to the base station 610 at the first time point preconfigured as the system information-requestable time point. That is, the transmission of the message requesting the first system information at the preconfigured first time point may mean that the first time point is configured in advance by the base station 610 as the system information-requestable time point, and that the information on the preconfigured first time point is obtained from the base station 610.

Accordingly, the base station 610 may receive the messages requesting system information from the first terminal 621, the second terminal 622, and the third terminal 623 included in the first group 620-1 at the first time point preconfigured as the system information-requestable time point. Then, the base station 610 may generate a message including the first system information and transmit the message to the first terminal 621, the second terminal 622, and the third terminal 623 included in the first group 620-1 at the time point preconfigured as the time point at which the first system information is transmitted.

Through the above-described manner, the base station 610 may receive the messages requesting system information from the fourth terminal 624, the fifth terminal 625, the sixth terminal 626, and the seventh terminal 627 included in the second group 620-2 at the second time point preconfigured as the system information-requestable time point, and transmit a message including the second system information to the fourth terminal 624, the fifth terminal 625, the sixth terminal 626, and the seventh terminal 627 included in the second group 620-2 at the time point preconfigured as the time point at which the second system information is transmitted.

Here, since the at least one terminal included in the first group 620-1 and the at least one terminal included in the second group 620-2 have the different system information request time points, the RACH preamble which is the resource used for requesting the first system information and the preamble and the RACH preamble which is the resource for requesting the second system information may be identical to each other. Also, since the time point at which the first system information is transmitted and the time point at which the second system information is transmitted are different from each other, the base station 610 may configure the identifier used for transmitting the first system information and the identifier used for transmitting the second system information to be identical to each other.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A method for receiving system information, performed in a terminal, the method comprising:
   receiving a first minimum system information from a base station;
   requesting a system information other than the first minimum system information to the base station via a contention-free physical random access channel (PRACH) preamble according to one of at least one system information request time indicated by the first minimum system information; and
   receiving the requested system information from the base station according to a system information transmission time indicated by the first minimum system information,
   wherein the first minimum system information includes a resource information on the contention-free PRACH preamble to be used in the requesting of the system information, and
   wherein when a transmission time of the requested system information and a transmission time of a second minimum system information are overlapped, the requested system information is distinguished from the second minimum system information by using identifiers configured respectively for the requested system information and the second minimum system information.

2. The method according to claim 1, wherein the one of at least one system information request time is selected according to a type of the requested system information.

3. The method according to claim 1, wherein the at least one system information request time includes a time point when the system information other than the first minimum system information is allowed to be requested.

4. The method according to claim 1, wherein the at least one system information request time includes a window during which the system information other than the first minimum system information is allowed to be requested.

5. The method according to claim 1, wherein when the first minimum system information indicates system information request through a physical uplink shared channel (PUSCH), the terminal requests the system information other than the first minimum system information via the PUSCH instead of the requesting of the system information via the PRACH.

6. A method for transmitting system information, performed in a base station, the method comprising:
   transmitting a first minimum system information to a terminal;
   receiving a request of a system information other than the first minimum system information from the terminal via a contention-free physical random access channel (PRACH) preamble according to one of at least one system information request time indicated by the minimum system information; and
   transmitting the request system information to the terminal according to a system information transmission time indicated by the first minimum system information,
   wherein the first minimum system information includes a resource information on the contention-free PRACH preamble to be used in the requesting of the system information, and
   wherein when a transmission time of the request system information and a transmission time of a second minimum system information are overlapped, the requested system information is distinguished from the second minimum system information by using identifiers configured respectively for the request system information and the second minimum system information.

7. The method according to claim 6, wherein the one of at least one system information request time is selected according to a type of the request system information.

8. The method according to claim 6, wherein the at least one system information request time includes a time point when the system information other than the first minimum system information is allowed to be requested.

9. The method according to claim 6, wherein the at least one system information includes a window during which the system information other than the first minimum system information is allowed to be requested.

10. The method according to claim 6, wherein when the first minimum system information indicates system information request through a physical uplink shared channel (PUSCH), the system information other than the first minimum system information is requested via the PUSCH instead of the requesting of the system information via the PRACH.

* * * * *